United States Patent [19]
Dehnicke et al.

[11] Patent Number: 5,962,576
[45] Date of Patent: Oct. 5, 1999

[54] WATER-BASED ADHESIVE

[75] Inventors: Stefan Dehnicke, Offenbach; Ernst List; Helmut Rullmann, both of Frankfurt am Main; Adolf Zellner, Mörfelden-Walldorf, all of Germany

[73] Assignee: Metallgesellschaft Aktiengesellschaft, Frankfurt am Main, Germany

[21] Appl. No.: 08/973,285

[22] PCT Filed: May 28, 1996

[86] PCT No.: PCT/EP96/02281

§ 371 Date: Feb. 13, 1998

§ 102(e) Date: Feb. 13, 1998

[87] PCT Pub. No.: WO96/38510

PCT Pub. Date: Dec. 5, 1996

[30] Foreign Application Priority Data

Jun. 2, 1995 [DE] Germany .......................... 195 19 945

[51] Int. Cl.$^6$ ........................................................ C08L 61/04
[52] U.S. Cl. ................................................................ 524/510
[58] Field of Search ............................................. 524/510

[56] References Cited

U.S. PATENT DOCUMENTS 5,728,767  3/1998  Kanetou .................................. 524/504

*Primary Examiner*—Paul R. Michl
*Attorney, Agent, or Firm*—Herbert Dubno; Jonathan Myers

[57] ABSTRACT

A water-based adhesive is disclosed which contains an aqueous dispersion of one or more phenol resins stabilized by one or more polyacrylates, one or more latexes with one or more halogenated polyolefins and one or more cross-linking agents. The invention also includes a method of priming a substrate in which the substrate is coated with the adhesive as a primer and then with a cover cement and finally bonded to rubber under vulcanization.

6 Claims, No Drawings

WATER-BASED ADHESIVE

FIELD OF THE INVENTION

The present invention relates to a water-based adhesive. The present invention also relates to the use of a water-based adhesive as primer on a substrate.

BACKGROUND OF THE INVENTION

From the U.S. Pat. No. 5,200,455 the aqueous composition of an adhesive is known, which is used as primer and contains an aqueous phenolic resin dispersion stabilized by polyvinyl alcohol, a latex of a chlorosulfonated polyethylene and a metal oxide. With this adhesive there is achieved a good adhesion (adhesive force) of a layer applied onto a substrate.

OBJECT OF THE INVENTION

It is the object of the present invention to provide a further adhesive which is free from organic solvents and can be used as adhesion promoter (primer).

SUMMARY OF THE INVENTION

The object underlying the present invention is acheived by a water-based adhesive containing an aqueous dispersion of one or several phenolic resins, which has been stabilized by one or several polyacrylates, one or several latices of one or several halogenated polyolefins and one or several cross-linking agents. The halogenated polyolefin is a water-dilutable or emulsifiable as well as dispersible, polymeric film-forming agent. To the inventive adhesive, pigments and/or soot may be added. As pigments in accordance with the invention $TiO_2$ and/or $SiO_2$ are preferably used. The inventive adhesive is free from organic solvents. It merely has a content of <5 wt-% of low-molecular, hydroxyl-containing organic compounds.

Surprisingly, the omission of organic solvents in the inventive agent does not lead to a deterioration of the adhesive force, not even in the case of iron-containing substrates, which would have to be expected in the form of a beginning formation of rust. With the inventive adhesive excellent corrosion resistances are surprisingly achieved. Substrates to be coated preferably include iron-containing metals, but also aluminium or plastics such as polyamide. When using the inventive agent no organic solvents are released. The agent can be handled very easily, as it does not affect the environment. Waste air cleaning and special fire protection measures are not necessary when employing the inventive agent. Due to the use of the inventive agent the coating process is environmentally acceptable and economic.

A preferred embodiment of the invention is an adhesive which on 100 parts of one or several halogenated polyolefins contains 0.1 to 80 parts of one or several polyacrylates, 50 to 500 parts of one or several phenolic resins and 1 to 100 parts of one or several cross-linking agents. In accordance with the invention, parts are meant to be parts by weight. With this composition a particularly high adhesive force of the adhesive is achieved. To the agent, 30 to 300 parts pigment and/or soot may in addition be added. The dry matter content of the aqueous suspension should be 17 to 65 wt-%.

A preferred embodiment of the invention is a water-based adhesive, where the aqueous dispersion of one or several phenolic resins, which has been stabilized by one or several polyacrylates, is obtained by mixing a) water,
b) one or several polyacrylates, and
c) one or several phenolic resins.

This dispersion is thus advantageously prepared without the use of an organic solvent. It can be prepared within a surprisingly short period and with very little effort.

A preferred embodiment of the invention is a water-based adhesive, where the phenolic resin is a condensation product of phenols with formaldehyde. With this heat-reactive phenolic resin good results are achieved with respect to the adhesiveness with a small content of low-molecular, hydroxyl-containing, organic compounds.

A particularly preferred embodiment of the invention is a water-based adhesive, where the phenolic resin is a resol and/or novolak resin. With this heat-reactive phenolic resin very good results are achieved with respect to the adhesiveness with a very small content of low-molecular, hydroxyl-containing, organic compounds.

A most preferred embodiment of the invention is a water-based adhesive, where at least one phenolic resin is hydrophobic. With this phenolic resin excellent results are achieved with respect to the adhesiveness with a negligeably small content of low-molecular, hydroxyl-containing, organic compounds.

A preferred embodiment of the invention is a water-based adhesive, where the polyacrylate is an alkali or ammonium salt of a polyacrylic acid and/or a substituted polyacrylic acid. With these dispersion-stabilizing polymers the best results are achieved in the stabilization of the phenolic resin dispersion. The addition of dispersing agents such as emulsifiers, cross-linking agents and/or defoaming agents as well as polyvinyl acetate and/or partly saponified polyvinyl acetate is advantageous.

The substituted polyacrylic acid is a polymerizate or secondary product of monomers with the general formula (I):

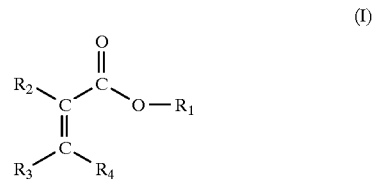

$R_1$=H, $CH_3$, alkyl $C_2$ to $C_4$, aryl,
$R_2$=H, OH, CN, $CH_3$, alkyl $C_2$ to $C_8$, F, Cl, Br,
$R_3$, $R_4$=H, $CH_3$, alkyl $C_2$ to $C_8$, aryl, O—$CH_3$, O-alkyl $C_2$ to $C_8$, O-aryl.

A preferred embodiment of the invention is a water-based adhesive, where the latex with one or several halogenated polyolefins is an emulsion copolymer of 2-chlorobutadiene and methacrylic acid. with these halogenated polyolefins the best results are achieved for the adhesiveness and the film formation. The chlorine content is 35% to 50%, the content of comonomers is 0.1% to 5%, based on the solid polymer in the latex.

A preferred embodiment of the invention is a water-based adhesive, where the cross-linking agent is one or several oxides of one or several polyvalent metals. With these cross-linking agents good results are achieved for the adhesiveness and the corrosion resistance.

A preferred embodiment of the invention is a water-based adhesive, where the cross-linking agent consists of one or several oxides of the metals Mg, Al, Ca, Zn, Zr, Cd and Pb. With these metal oxides very good results are achieved for the adhesiveness and the corrosion resistance.

In accordance with the invention there is provided the use of the adhesive as primer on a substrate.

In accordance with the invention there is provided the use of the water-based adhesive, where the substrate is coated with the adhesive as primer and then with a cover cement and finally bonded to a rubber under vulcanization conditions.

The invention will subsequently be explained in detail with reference to examples.

EXAMPLES

Example 1

Specimens consisting of 5 cm$^2$ counter-sunk screws were coated with an inventive adhesive primer (A) in accordance with Table 1 and for comparison with the solvent-containing primer (B) (Megum 3270$^R$ Chemetall GmbH) and dried. Before the test, the counter-sunk screws made of steel (ST 37) were cleaned by means of sandblasting and degreased. Subsequently, both specimens were coated with adhesion promoters (cover cement) Megum 100$^R$ (X) and Megum 14550$^R$ (Chemetall GmbH) and kept at ambient air for about 1 hour. Then, the specimens were vulcanized with a rubber in accordance with Table 2. The adhesion was tested after 24 hours. Table 3 shows a comparison of the coefficients of adhesion. Table 4 shows a comparison in the salt-spray test. Table 5 shows a comparison in the boiling-water test.

TABLE 1

Composition: primer (A)

| Constituents | Contents in wt-% |
| --- | --- |
| Copolymer latex of 2-chlorobutadiene and methacrylic acid[1] | 16.0 |
| Resol[2] (H$_2$O < 5 wt-%), stabilized with sodium polyacrylate | 19.0 |
| ZnO | 1.5 |
| ZrO$_2$ | 2.2 |
| Cross-linking agent[3] | 0.35 |
| Soot[4] | 1.2 |
| TiO$_2$ | 5.8 |
| Silicic acid[5] | 1.6 |
| Water[6] | 52.35 |

[1] nonionic
[2] gel time at 130° C. (DIN ISO 9396): 12 min
viscosity at 20° C. (DIN ISO 9371): 4000 mPa · s
content of free phenol: about 12 wt-%
[3] Fenopon/Anterox (GAF Chemie)
[4] F 101 (Degussa AG)
[5] Aerosil A200 (Degussa AG)
[6] demineralized

TABLE 2

Composition: rubber
NR mixture (65 Shore A)

| Constituents | Contents in parts by weight |
| --- | --- |
| Natural rubber[7] | 100.0 |
| Stearic acid | 2.5 |
| ZnO | 5.5 |
| Naftolen P612[8] | 2.0 |
| Soot N220[9] | 50.0 |
| Vulkanox PAN[10] | 1.0 |
| IPPD Vulkanox 4010 NA[10] | 0.4 |

TABLE 2-continued

Composition: rubber
NR mixture (65 Shore A)

| Constituents | Contents in parts by weight |
| --- | --- |
| CBS[11] | 0.5 |
| Sulfur | 2.6 |

[7] Kautschukgesellschaft mbH
[8] Chemetall GmbH
[9] Degussa AG
[10] Bayer AG
[11] cyclohexyl benzothiazyl sulfenamide (Bayer AG)

TABLE 3

Adhesion test
Combination of adhesives: primer/cover
Vulcanization was effected in 21 min at 150° C.

| Primer/ Cover | Preconditioning time (min) | Coefficients of adhesion (mPa) | Fracture pattern in the rubber (% R) | Fracture pattern Tearing from metal (% M) |
| --- | --- | --- | --- | --- |
| A/X | 0 | 10.2 | 100 | 0 |
| B/X | 0 | 10.9 | 100 | 0 |
| A/Y | 0 | 10.4 | 100 | 0 |
| B/Y | 0 | 11.2 | 100 | 0 |
| A/X | 5 | 11.2 | 100 | 0 |
| B/X | 5 | 11.0 | 98 | 2 |
| A/Y | 5 | 10.9 | 100 | 0 |
| B/Y | 5 | 10.9 | 100 | 0 |
| A/X | 10 | 12.0 | 100 | 0 |
| B/X | 10 | 11.8 | 98 | 2 |
| A/Y | 10 | 10.1 | 100 | 0 |
| B/Y | 10 | 10.0 | 99 | 1 |

TABLE 4

Salt-spray test
2 kg tensile load at an angle of 180° (NR 65 Shore A)

| Combination of adhesives | Time (h) | Peeling (%) |
| --- | --- | --- |
| (A)/(X) | 1.000 | <5 |
| (B)/(X) | 1.000 | <5 |

TABLE 5

Boiling-water test
T = 96° C. to 100° C.
2 kg tensile load at an angle of 90° (NR 65 Shore A)

| Combination of adhesives | Time (h) | Peeling (%) |
| --- | --- | --- |
| (A)/(X) | 24 | 0 |
| (B)/(X) | 24 | 0 |

Example 2

The inventive adhesive in accordance with Table 1 was used as primer in combination with a cover cement on different substrates, and upon vulcanization with an EPDM mixture in accordance with Table 6 the adhesiveness was tested. Table 7 illustrates the coefficients of adhesion on the different substrates, where the destructive test led to a substantial rubber fracture in all cases.

TABLE 6

Composition:
EPDM mixture (40 Shore A)
Vulcanization was effected in 26 min at 160° C.

| Constituents | Contents in parts by weight |
| --- | --- |
| EPDM Keltan ® 512 × 50[12] | 150.0 |
| Stearic acid | 1.0 |
| ZnO | 5.0 |
| Naftolen P613[8] | 7.0 |
| Soot N990[9] | 100.0 |
| Perkadox ® 14–40[13] | 9.0 |
| TAC 70[14] | 2.14 |

[12]DSM
[13]Akzo AG
[14]trialylcyanorate (Degussa AG)

TABLE 7

Coefficients of adhesion for primer (A) on different substrates in combination[25] with Megum 14550[R] as cover cement in a peel test. Vulcanization was effected in 26 min at 160° C.

| Substrate | Coefficients of adhesion (N/mm) | Fracture pattern in (% R) |
| --- | --- | --- |
| Stainless steel ST 37 | 8.9 | 100 |
| Aluminum | 9.4 | 100 |
| Electroplated steel | 9.3 | 100 |

In the above documented tests metal defects for the inventive primer formulation were recorded neither in the case of zero adhesion nor when preconditioning the coated specimens. The primer formulation turned out to be preconditioning-resistant. It had very good adhesion on all kinds of metals as substrate. For the corrosion resistance very good results were achieved. The primer formulation provided very good results in combination with all kinds of standard cover cements.

We claim:

1. A water-based adhesive free of an organic solvent, which comprises:

(a) an aqueous dispersion of at least one phenolic resin which is a condensation product of a phenol and formaldehyde, wherein the aqueous dispersion is stabilized by at least one polyacrylate which consists of a monomer of the Formula:

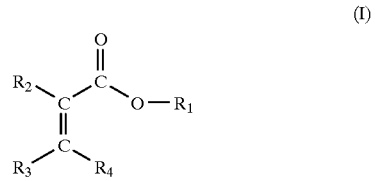

(I)

wherein
$R_1$ is H, $CH_3$, $C_2$ to $C_4$ alkyl or aryl;
$R_2$ is H, OH, CN, $CH_3$, $C_2$ to $C_8$ alkyl, F, Cl or Br;
$R_3$ and $R_4$ are each H, $CH_3$, $C_2$ to $C_8$ alkyl, aryl, O—$CH_3$, O—$C_2$ to C8 alkyl, or O-aryl;

(b) a lattice formed from at least one halogenated polyolefin; and (c) at least one metal oxide as a cross linking agent.

2. The water-based adhesive as defined in claim 1 containing per 100 parts of one halogenated polyolefin,
0.1 to 80 parts of at least one polyacrylate;
50.0 to 500 parts of at least one phenolic resin; and
1.0 to 100 parts of at least one cross-linking agent.

3. The water-based adhesive as defined in claim 1 wherein the polyacrylate is an alkali or ammonium salt of a polyacrylic acid and/or a substituted polyacrylic acid.

4. The water-based adhesive as defined in claim 1 wherein the crosslinking agent consists of at least one oxide of a metal selected from the group consisting of Mg, Al, Ca, Zn, Zr, Cd and Pb.

5. A method of priming a substrate which comprises the step of coating said substrate with the water-based adhesive defined in claim 1.

6. The method of priming a substrate defined in claim 5 wherein the substrate is coated with the water-based adhesive as a primer and then with a cover cement and is finally bonded to rubber under vulcanization.

* * * * *